United States Patent [19]

Levinson et al.

[11] 4,242,701

[45] Dec. 30, 1980

[54] COLOR HARDCOPY FROM ELECTRONIC INFORMATION

[75] Inventors: Leon A. Levinson, Agoura; John K. Cool, Thousand Oaks, both of Calif.

[73] Assignee: Ixion, Inc., Westlake Village, Calif.

[21] Appl. No.: 73,933

[22] Filed: Sep. 10, 1979

[51] Int. Cl.³ .................. H04N 1/46; H04N 9/491
[52] U.S. Cl. .................................. 358/75; 358/5
[58] Field of Search .............. 358/5, 6, 75, 76–80; 346/76 L, 108, 109; 354/100–102

[56] References Cited

U.S. PATENT DOCUMENTS

| | | | |
|---|---|---|---|
| 3,679,818 | 7/1972 | Courtney-Pratt | 358/75 |
| 3,842,195 | 10/1974 | Takahashi et al. | 358/75 |

*Primary Examiner*—John C. Martin

*Attorney, Agent, or Firm*—Robert E. Geauque; John J. Posta, Jr.

[57] ABSTRACT

Apparatus and method for producing color hardcopy from computer or video generated electronic information and utilizing a film with a repeating color stripe pattern on one side and an unexposed silver halide layer on the other side. A laser beam of a single monochromatic frequency scans across the unexposed silver halide layer from the side opposite the color stripes, the beam being smaller than an individual color stripe and being modulated in intensity to provide a variable strength latent image in the silver halide corresponding to red, blue and green intensity components of the video image so that the resulting film can be illuminated from either side to be viewed in color after processing.

17 Claims, 4 Drawing Figures

COLOR HARDCOPY FROM ELECTRONIC INFORMATION

BACKGROUND OF THE INVENTION

When computer or video generated information is displayed on a color monitor on which the display is transient, it is desirable in many cases to maintain permanent records of the information displayed. In the case where industrial processes are monitored by color display, a permanent record would be valuable for later examination to document or study a particular condition or event. Present systems employ various methods of photographing the display tube face to yield color hardcopy. These methods may be as simple as photographing the tube face directly, or through sequenced color filters, or photographing a special high resolution black and white display tube sequentially through appropriate color filters to reconstruct the color image. These methods all suffer from the limitations imposed by the displayed device. These limitations relate to such items as image resolution and color quality, the problems associated with holding the particular image on the display tube while the photograph is being made, and how to obtain the picture without interfering with the operators' view of the display.

Another system of producing a color hardcopy from an original is disclosed in U.S. Pat. No. 3,842,195 issued Oct. 15, 1974, to Tsunehiko Takahashi. This system employs a laser beam which is modulated by a color signal from an original and the beam is radiated onto a photosensitive material which yields different colors according to the intensity of light radiated thereon. A special photosensitive material is used to record the color which will yield different colors in response to the intensity of the laser beam. However, since the recording medium is divided into two or three materials which are responsive to different intensities, the reproduction would not be full color with a tone scale. Another method for producing color hardcopy is illustrated in U.S. Pat. No. 3,679,818 issued July 25, 1977 to Jeofry Stuart Courtney-Pratt. This system utilizes a film with a repeating color dot pattern on one side and opaque coating on the other side. Laser light having the same frequency as the dot color is directed through those dots constituting the desired image, and the metal coating behind each such dot is thereby evaporated, leaving the dot color uneffected. Preferrably, a laser with three independent beams each of which corresponds in frequency to one of three basic colors is utilized and the contribution of each color component is adjusted by using only the corresponding frequency scanning beam operated at levels sufficiently intense to evaporate the metal coating. This patent also suggests a single laser to remove the region of the opaque layer behind the dots to constitute the desired image. This system does not have any tone scale since upon the melting of the layer, the full color of the dot is produced. Other patents of interest in connection with this field are as follows:

| | |
|---|---|
| 2,951,116 | Sites, et al |
| 3,181,170 | Akin |
| 3,351,948 | Bonn |
| 3,651,488 | Amodei |
| 3,922,711 | Sasabe, et al |
| 3,924,049 | Truitt, et al |
| 3,961,334 | Whitby, et al |
| 3,962,513 | Eames |
| 3,787,210 | Roberts |
| 3,787,873 | Sato, et al |
| 4,012,776 | Mrdjen |
| 4,101,907 | Bell, et al |
| 4,107,733 | Schickedanz |
| 4,158,715 | Smith, et al |

SUMMARY OF THE INVENTION

The present invention relates to the formation of color images in a photographic medium and the image source is electronic video images in the form of analogue electrical signals which can be obtained from any one of a number of sources, such as a television camera, a computer produced synthetic image, or a computer which is driven by transducer instrumentation. The image on a television tube can be formed by clusters of red, green and blue dots whose intensity or brightness is controlled in such a way as to form a recognizable picture. The image source therefore consists of amplitudes for the red, green and blue components of the picture and the present invention utilizes the same three amplitude signals for producing a color hardcopy of matter displayed on the video tube.

The individual amplitude signals are utilized to modulate a monochromatic laser beam which is swept across a particular type of photographic film. The film has a repeating color stripe pattern of red, green and blue on one side and unexposed silver halide layer on the other side and the laser light beam of a single monochromatic frequency is directed onto the unexposed silver halide layer from the side opposite the color stripes. The beam is smaller than an individual color stripe and is scanned across the color stripes while the beam intensity is modified or varied to create a variable strength latent image in the silver halide of varying shades of white, black and grey. The laser beam is sequentially modulated by the corresponding red, blue and green intensity components of the video image such that the silver halide area under the green stripes on the film has the same intensity as the green video signal representing the same geometric area of the video image and likewise for the red and blue. The resulting film after processing can be viewed in color with illumination from either side.

The particular film utilized in this invention is commercially available under the name of Polavision produced by Polaroid Corporation so that no special film medium need be produced to practice the invention. Because there is intensity modulation for each of the colors at each location on the film, it is possible to produce color hardcopy in all of the tones of the original. The light falling on the light sensitive layer behind each color stripe is directly related to the amount of that color of light in the original image. During the processing step, the light exposure behind each line is converted to a mask image in shades of grey. The scanning with a single color laser results in full color reproduction provided that the modulation of the laser be synchronized with each color band as the scan beam moves laterally across the film over the band. The image is constructed by multiple sweeps across the film, which is analogous to the way in which the color television image is produced from the same signal.

DESCRIPTION OF THE PREFERRED EMBODIMENT

Figure 1:
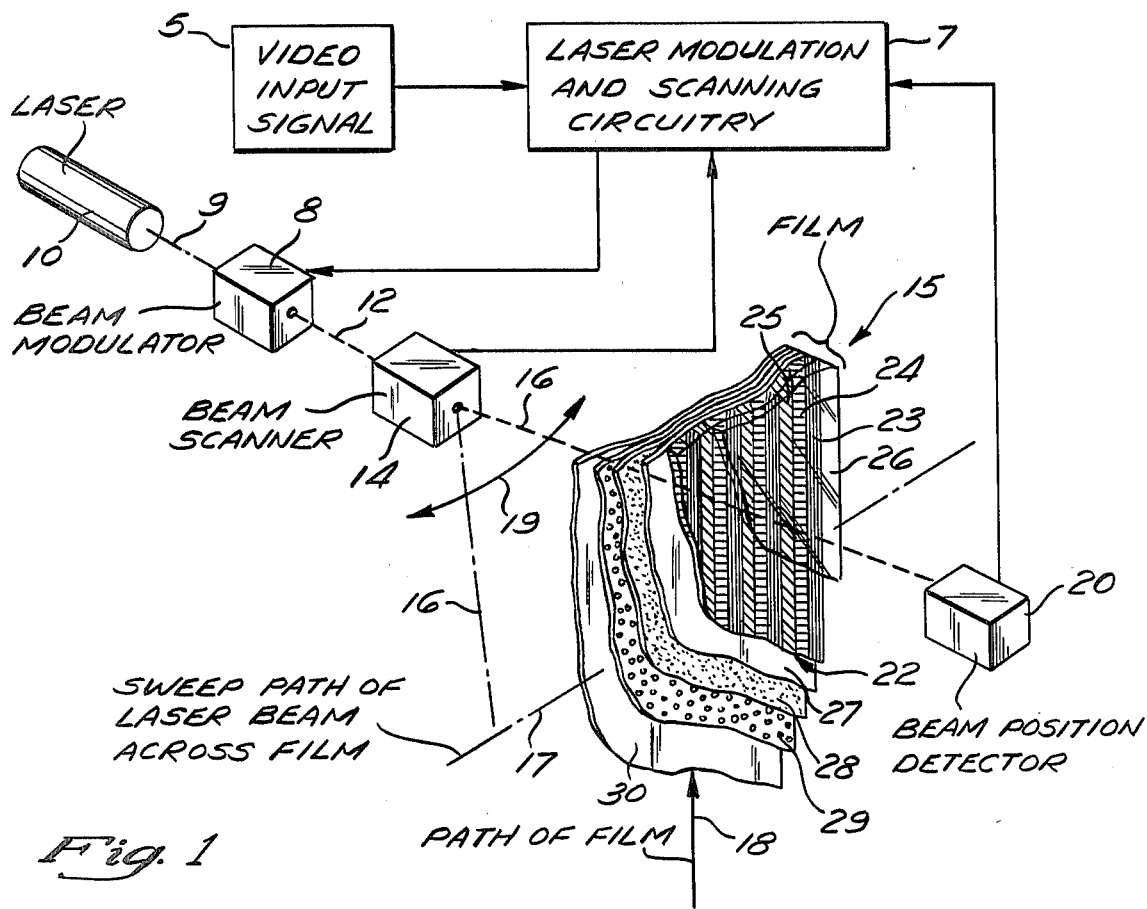
FIG. 1 is a schematic perspective view of the present invention illustrating the laser beam and the construction of the film scanned by the laser.

Referring to FIG. 1, source 5 of the video input signal, which is to be reproduced in color hardcopy, can be derrived from any computer or video generated information that is now generally displayed on a color monitor where the display is transient. The video input signal from source 5 is imparted to circuitry 7 which transforms the video signals into modulation and scanning signals to be used by the laser system. This circuitry 7 controls an acousto-optic modulator 8 which modulates the amplitude of monochromatic beam 9 produced by laser 10. Modulator 8 varies the intensity of the laser beam 9 in accordance with the amplitude of successive signals obtained from the video input 5 for the colors red, green and blue. During modulation, modulated beam 12 is scanned by scanner 14 across the back side of film 15. The sweep path of the beam is confined between beam lines 16 and sweeps different lines on the film as the film 15 moves upwardly relative to the scanner is indicated by arrow 18. In order to properly position the beam angle 19 with respect to the stripes on the film, a beam position detector 20 is utilized to sense when the beam 16 is aligned with the first red stripe 23 of the film and at that time, the circuitry 7 is triggered to commence with the amplitude signal for a selected color for the first line and permit the scan to continue across the film imparting to each of the lines a corresponding signal intensity.

Film 15 consists of a layer 22 of alternating red stripes 23, blue stripes 24 and green stripes 25 running lengthwise of the film. The individual stripes are very thin, for example 4500 individual lines per inch. A clear plastic support layer 26 is located in front of the layer of stripes. Behind the stripe layer are located in sequence alkali guard layer 27, positive image receiver 28, unexposed silver halid (AgX grains) 29 and stabilizer precurser 30. For purposes of discussion, the front side of the film is at layer 26 and the back side is at layer 30. The stabilizer layer normally includes an antihalation dye which does not have any substantial impedance to the passage of the laser beam into the light sensitive layer 29.

As the laser beam 16 sweeps across the back of the film 15, its intensity varies in accordance with the color of film line upon which it is impinging and this intensity is recorded in layer 29 which causes the various shades of grey to be produced in layer 28 after processing so that when a light is shown through the exposed and processed film, the reproduced image at any location will have a color corresponding to the amount of light let through the positive image receiving layer 28 to the area of the particular color band. The grey image modulates the amount of light and the color stripes control the color tones passing through, and thus, the net effect is a reconstruction of the original image. The light sensitive layer is energized directly by the intensity of the sweeping laser beam, whereas in normal use the light sensitive layer would be energized by the optical exposure of the film by the camera through the color stripes. The sweep of a single colored laser beam results in full color reproduction provided only that the modulation of the beam be synchronized with each color stripe as the scan beam moves laterally across the film over the band. The image can then be constructed by multiple sweeps across the film.

Figure 3A:
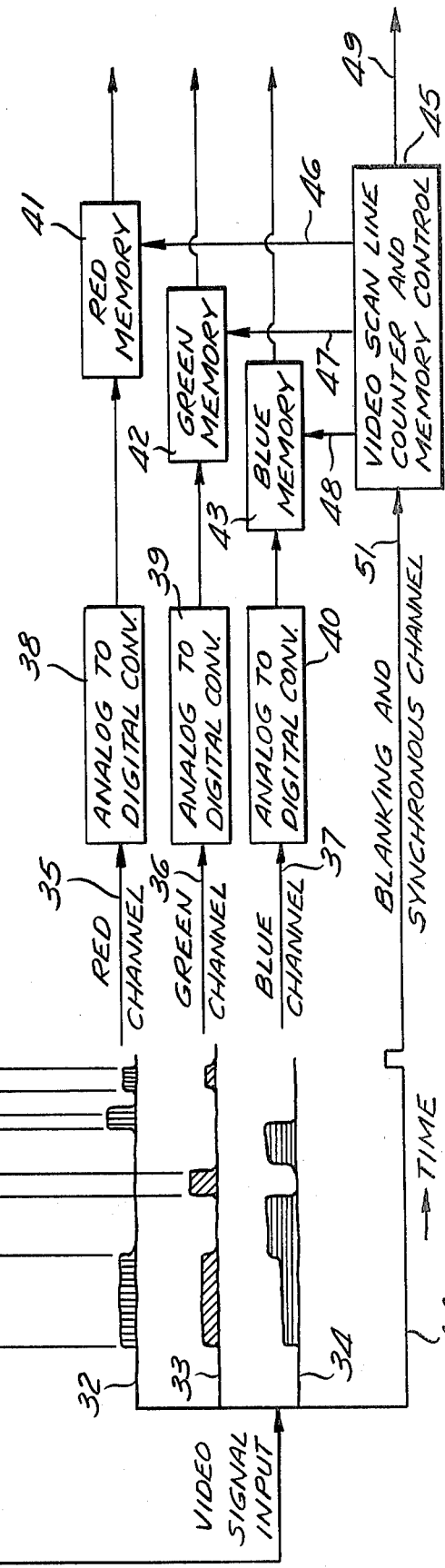
FIG. 3a is a schematic illustration of the circuitry for obtaining the red, green and blue signal inputs from the electronic video image.
Figure 3B:
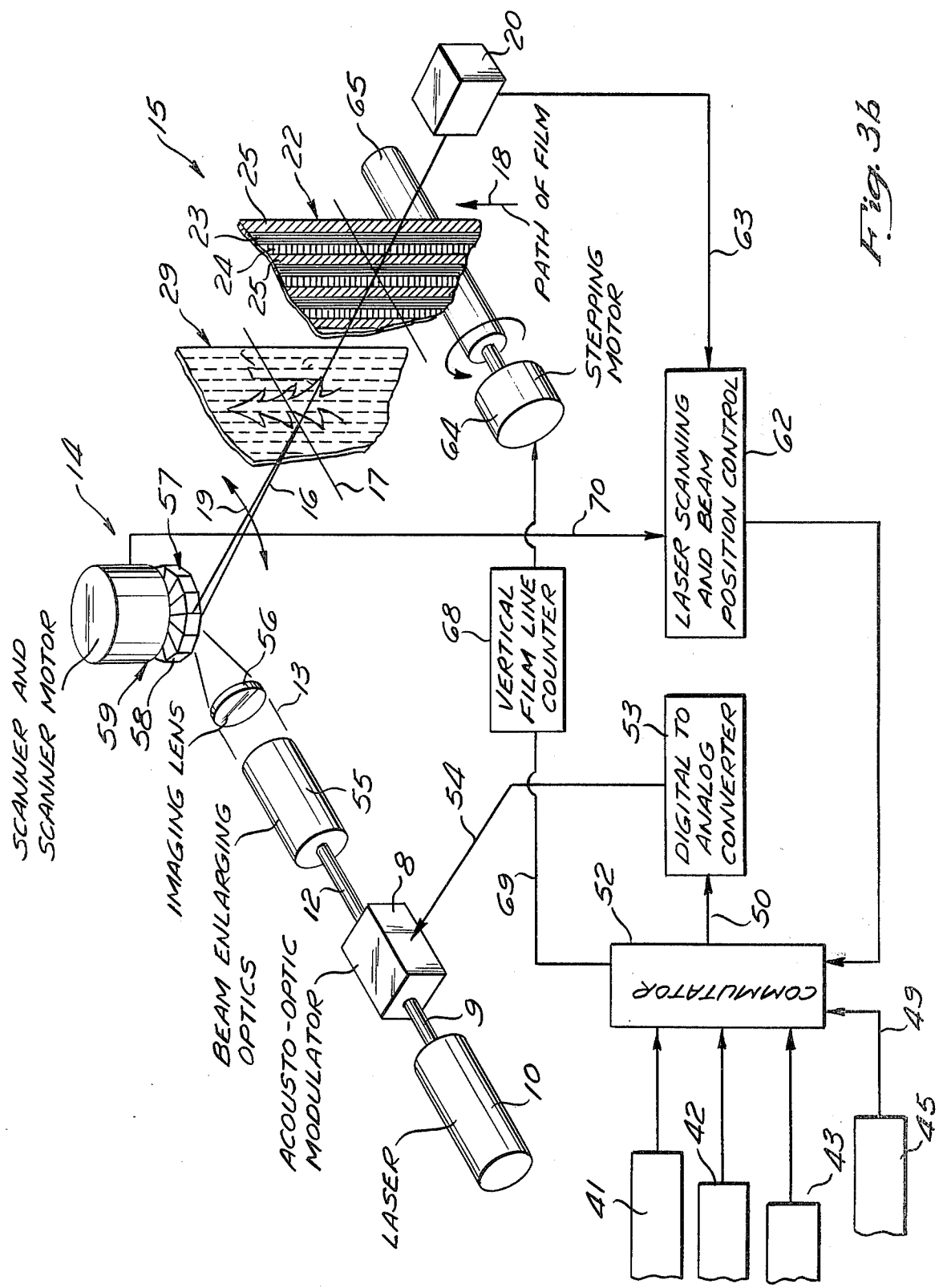
FIG. 3b is a schematic illustration of the circuitry for transforming the signal inputs into laser modulating and scanning signals.

The circuitry 7 for translating the video input signal into actuating signals for the laser beam is illustrated in FIGS. 3a and 3b. For purposes of this illustration, the input signals for a video picture screen 30 at a particular scan line 31 is illustrated by the signal amplitude inputs 32, 33 and 34 which are representative of the red, green and blue input signals, respectively. These signals are connected through the lines 35, 36 and 37, respectively, to digital to analogue converters 38, 39 and 40, respectively. The converters are connected with red, green and blue memories 41, 42 and 43, respectively, each of which has the capacity to store a predetermined number of scan lines, after which the memory will not pick up any further information. For instance, if a frame is selected which consists of 525 scan lines, then the memories can be selected to store 25 scan lines. While the memories are being loaded, the number of scan lines placed in each memory is introduced from channel 51 to video scan line counter and memory control 45. When 25 scan lines have been placed in each of the memories, the unit 45 will turn off the memories through lines 46, 47 and 48 and turn on the commutator 52 through line 49. Thereafter, the unit 45 will continue to count the scan lines and will again turn on the memories and turn off the commutator 52 after another 525 lines (corresponding to a frame) have been counted. The memories will then accept the next 25 scan lines before the control unit 45 will again turn off the memories and turn on the commutator. Thus, the scan lines are added to the memories in sets, comprised for example, of 25 scan lines each, and with a frame of 525 scan lines there will be 21 sets. Since 525 lines are scanned after placing of each set in the memories, commutator 52 and the laser have the full time of one frame scan to empty the memories and to sweep the 25 lines on the film 15. Channel 51 is connected with the blanking and synchronous signal of the video input line 44 which initiates each scan line of the video picture 30.

Converter 53 is connected by line 54 to the acousto-optic modulator 8 which modulates the intensity of the laser beam in accordance with the amplitude signal derrived from the commutator. The switching of the commutator is such as to impart the intensity levels in the red, green and blue channels for each pixel, or set of three stripes, to the film, so that the intensity of the beam can change as it moves over the stripes. The modulated beam 12 is enlarged by optic device 55 into a beam which is then focused by imaging lens 56 upon the surface of rotating disc 57 of scanner 14. The scanner disc consists of a plurality of flat reflecting segments 58 located at an angle to one another, and as the beam is imaged upon each of the segments upon rotation by motor 59, the beam will sweep across the film 15 and will be focused on the light sensitive film layer 29. The particular area behind a particular color line will be lightened by an amount depending upon the intensity of the focused laser beam. Thus, if the laser intensity at a particular color stripe is very low or non-existent, the silver halide layer will be dark, whereas, if the intensity of the beam at a particular color point is high, the silver halide layer will become light.

After each scan line, the film 15 is driven upwardly the distance of one scan line by a roller 65 driven by stepping motor 64. The stepping motor is actuated by vertical line counter 68 which is connected by line 69 to commutator 52. Counter 68 counts the number of lines in a given scan and then steps the motor at the end of each scan. Each impulse of the commutator is counted until the number of impulses correspond to the stripes in the film and then roller 65 is stepped in the upward direction 18 by motor 64 by one scan line.

Figure 2:
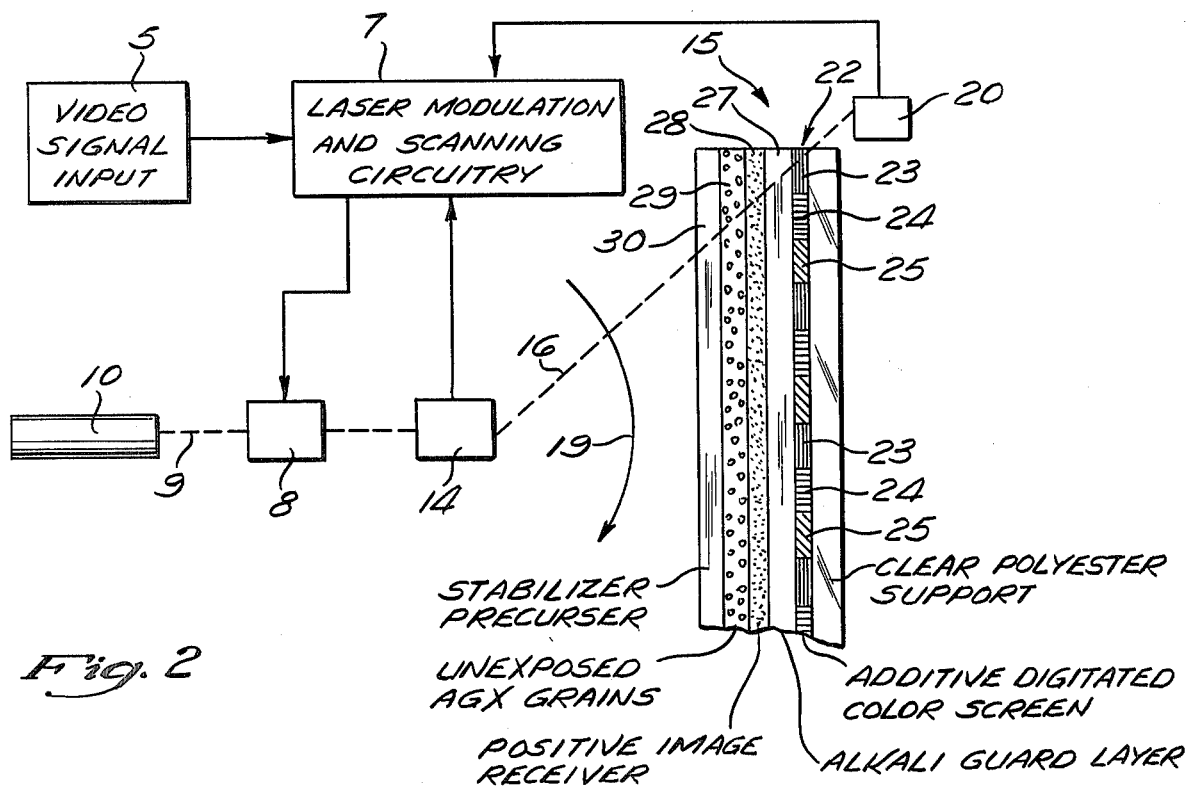
FIG. 2 is a plan view of the schematic of FIG. 1.

In order to assure that the commutator will not commence to modulate the laser signal until the laser is properly in line with the first color stripe, the position of the scanner 14 is adjusted so that the laser beam 18 passes through the first red color stripe (see FIG. 2) and energizes the position detector 20 which indicates a predetermined absolute position of the beam relative to the film. The signal from detector 20 is introduced to laser scanning and beam positioning control 62 through line 63. Also, in order to assure that the commutator remains in sync with the scanner 14, a position signal from the motor 59 is directed to control 62 through line 70. The signal in line 63 assures that the commutator starts each scan line when the scanning motor is in position to impart that information to the first of the stripes of the sweep, and the signal in line 70 will control the commutator to transmit the modulation for a given stripe when the laser beam is in position corresponding to this stripe on film 15.

The picture 30 is typical of a video television picture obtained from a three channel input of red, green and blue. The picture can result from a dot pattern on the screen or from a series of lines running lengthwise of the screen. The signals 32, 33 and 34 producing the picture at the scan line 31 have amplitudes such that over the zone 70, the red, green and blue have about equal amplitudes to produce the white pattern 71 of the picture since these colors are additive to produce white. The zone 72 is totally within a green area 73 and the amplitude signal appears on the green channel with the other two channels having no substantial amplitude. The zone 74 appears within a red area 75 which appears on the red channel only. Zone 76 appears in a yellow area 77 which is produced by the combination of red and green signals on the respective channels. The same colors along the scan line 31 will be reproduced on the film 15 at a given scan line by varying the silver halide film density adjacent the colored stripes with these signals.

The Polavision film presently available for use in motion picture cameras is packaged in cassettes that are placed in the camera for exposure. The cassette also contains the chemicals required to process the film after exposure. After exposure, the cassette is placed in a player where the film is processed during the rewind operation and is then ready for repeated viewing by means of a rear screen projection system in the player. The individual alternating red, green and blue filter stripes running lengthwise of the film are very thin, for example, 4500 individual lines per inch. In camera use, the optical image produced by the camera lens passes through the layers containing the alternating red, green and blue filter stripes. The light falling on the light sensitive layer behind each color filter is directly related to the amount of that color of light in the original image. During the processing step the light exposure behind each line is converted to a mass image in shades or grey. When the finished film is placed in an optical system and white light is projected through the film, the grey image modulates the amount of light in the color bands and controls the color passing therethrough. The net effect is a reconstruction of the original image.

The present invention produces a full color image by modulating the light sensitive image without passage of an optical image through the filter layers. This is accomplished by the exposure of the film from the reverse side compared to the camera by means of the laser beam focused upon a small spot and scanned across the film while being modulated according to the video signal information. The final film 15 can be viewed in color withh illumination from either side and the information is in the form of a permanent record. The information displayed is of a transient color display and is obtained from a system without interfering with the color display device. The system of this invention can be activated on command to produce a color hardcopy of the color information currently being displayed. Since the color hardcopy is recorded at reduced size, analogous to microfilm, the many images of individual records can be stored in compact form. Because of the characteristics of the Polavision film, the color film is chemically processed by self-contained instant system which requires no complex process machinery or services. The colored images on the photographic film can be read with the aid of an optical magnification device or enlarged copies can be made in color as the need arises. Since the light sensitive layer on the film is panchromatic, a low cost, highly reliable laser (such as a helium-neon laser) could be used having monochromatic light of any suitable color. The resolution of the system depends on the width of the film, i.e., the actual number of color band lines or triplets. Following exposure, a device can perform the functions of rewinding/processing and location and display of specified images by projection enlargement. Such functions are no part of the subject invention and can be done in a well-known manner as with microfilm and other stored information. Also, a computer controlled addressing system could be used to identify each color hardcopy image by means of a permanent code on the film.

It is understood that the illustrated circuitry for imparting the information in the red, green and blue channels to the modulator in proper sync with the color stripes of film 15 is by way of example only and that various more detailed circuitry can be utilized in accordance with the refinements desired. For instance, a feed back circuit could be employed from the commutator to the scanner motor to control the motor speed in accordance with a predetermined commutator operation speed. It is also understood that the use of an acousto-optic modulator and rotating mirror scanner are by way of example only and other known means of laser modulation and beam deflection might be employed. The laser 10 could consist of a Hughes Laser Model 3224HPC and the modulator could be Model DLM-40 of Anderson Laboratories. A suitable scanner Model 6-60 is produced by Lincoln Laser Company. The other components, such as the signal converters, counters and the commutator are of well-known construction.

Having described the invention in connection with certain embodiments thereof, it will be understood that further modifications may now suggest themseleves to those skilled in the art and it is intended to cover such modifications which fall within the scope of the invention.

What is claimed is:

1. An apparatus for producing a color image from electronic video input signals containing the additive primary colors red, green and blue comprising:
   a laser for producing a monochromatic laser beam;
   a photographic medium comprising a transparent film having on one side a repeating pattern of color areas composed of said additive primary colors red, green and blue and an unexposed light sensitive layer on the reverse side;
   means for scanning said laser beam across successive lines of said light sensitive layer from said reverse side; and
   means for modulating the intensity of said beam during scanning to alter the grey scale of said light sensitive layer opposite each of said areas in accordance with the intensity of said electronic signal for each of said primary color areas to produce said color image.

2. An apparatus as defined in claim 1 wherein:
   said repeating pattern comprising color stripes of red, green and blue extending lengthwise of said film, one pixel being composed of one red, one blue and one green stripe.

3. An apparatus as defined in claim 1, said light sensitive layer comprising a layer of silver halide.

4. An apparatus as defined in claim 1 wherein:
   said repeating pattern comprising color stripes of red, green and blue extending lengthwise of said film, one pixel being composed of one red, one blue and one green stripe;
   said light sensitive layer comprising a layer of silver halide.

5. An apparatus as defined in claim 4, said medium comprising an alkali guard layer and a positive image receiver layer between said color stripe layer and said silver halide layer, a clear protector support layer in front of said stripe layer and a stabilizer precurser layer in back of said silver halide layer.

6. An apparatus as defined in claim 1 wherein:
   said input signals comprising successive video frames, each frame having the same predetermined number of scan lines;
   said modulating means comprising means for storing said input signals from portions of said scan lines;
   cummutator means for unloading each portion of said scan lines from said storing means during the period of a number of scan lines equivalent to a video frame;
   means responsive to said input signals for controlling said commutator means to unload successive portions of a frame; and
   a beam modulator controlled by said commutator means.

7. An apparatus as defined in claim 6, said modulator being actuated by said commutator means for producing a separate intensity modulation of said beam for each color stripe of each scan line.

8. An apparatus as defined in claim 6, said scanning means comprising means for stepping said medium one scan line after each scan line is unloaded by said commutator means from said storage means.

9. An apparatus as defined in claim 6, said scanning means comprising a rotatable disc having reflecting segments, said modulated beam being directed to and reflected from said segments for scanning said beam over said medium during rotation of said disc.

10. An apparatus as defined in claim 6 wherein said scanning means comprises means for positioning said beam at said first color stripe prior to commencing said scanning of said beam across said film.

11. A method for producing a color image from video electronic information in the form of video input signals for the additive primary colors red, green and blue comprising the step of:
   a. producing a monochromatic laser beam;
   b. scanning said beam over a light sensitive layer of a photographic medium to vary the grey intensity of said layer in accordance with the intensity of said beam;
   c. placing adjacent said light sensitive layer a repeating pattern of primary color areas; and
   d. modulating said beam in intensity in response to the amplitude of each of said color input signals corresponding to the particular color area receiving said beam.

12. A method as defined in claim 11 wherein said modulating step comprises:
   a. separately storing said red, green and blue video input signals for a predetermined number of scan lines;
   b. unloading said stored signals for each color area by a commutator;
   c. and connecting said commutator output with a beam modulator.

13. A method as defined in claim 12 comprising the step of unloading said stored signals over a period corresponding to scanning of a complete frame of video input signals.

14. A method as defined in claim 11 comprising the step of arranging said color areas into a repeating pattern of primaryy color lines of red, green and blue extending lengthwise of said photographic medium and broader in width than said beam.

15. A method as defined in claim 14 comprising the step of producing said light sensitive layer from silver halide.

16. A method as defined in claim 11 comprising the step of advancing said photographic medium in response to the number of color areas corresponding to a scan line.

17. A method as defined in claim 13 wherein said scanning step includes the step of synchronizing the modulation of said laser beam with each color area.

* * * * *